Figure 1:
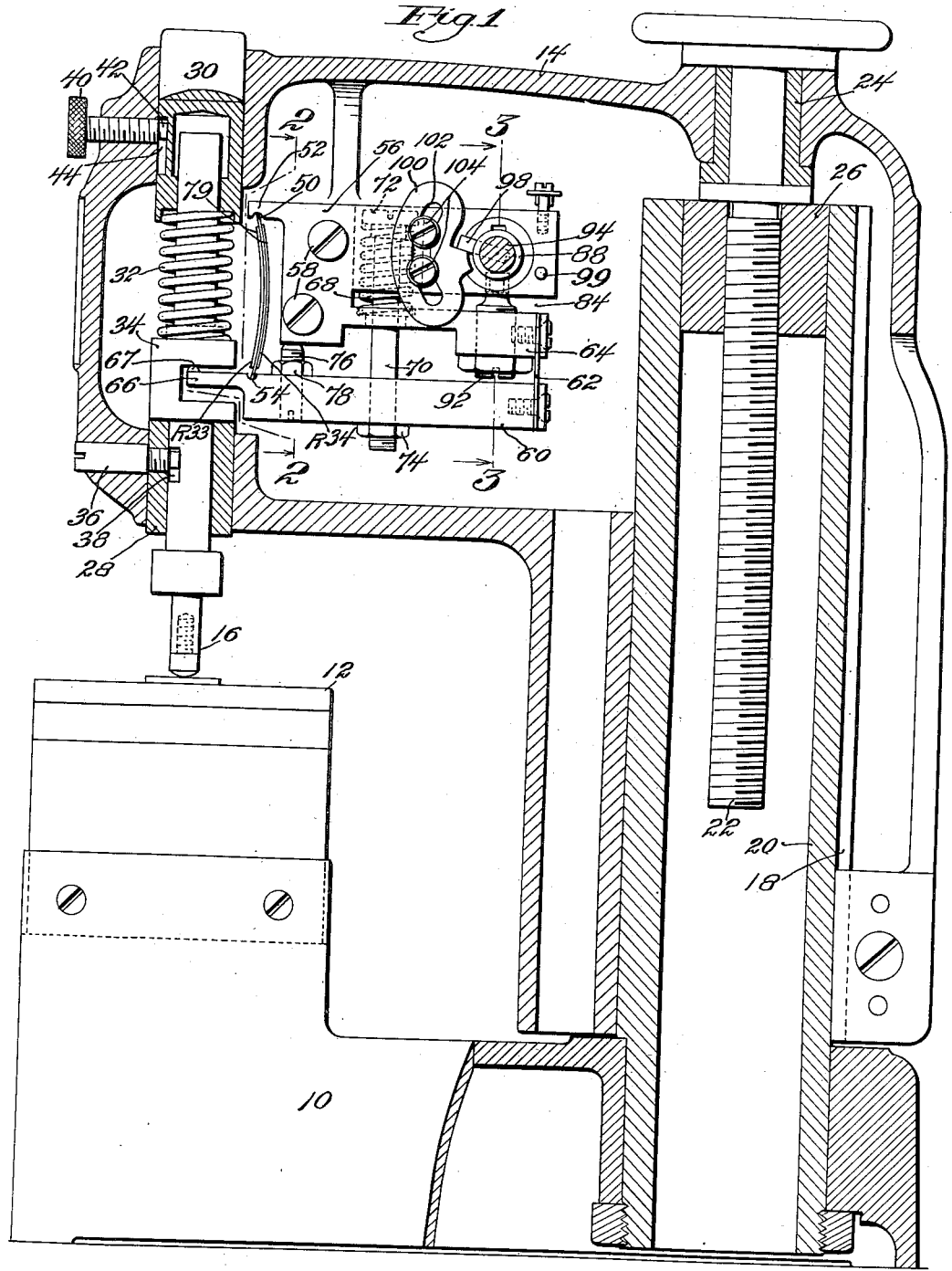

Jan. 1, 1952 G. N. LEVESQUE 2,581,264
GAUGE
Filed Aug. 1, 1945 3 Sheets-Sheet 1

Witness
Jas. J. Maloney

Inventor
George N. Levesque
by his Attorney
Maxwell Fish

Jan. 1, 1952  G. N. LEVESQUE  2,581,264
GAUGE
Filed Aug. 1, 1945  3 Sheets-Sheet 2
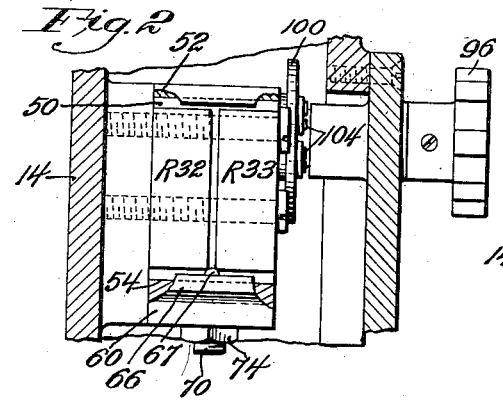
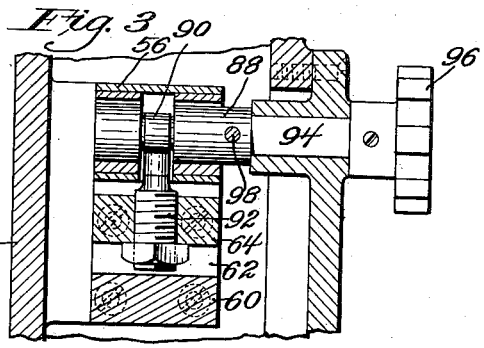
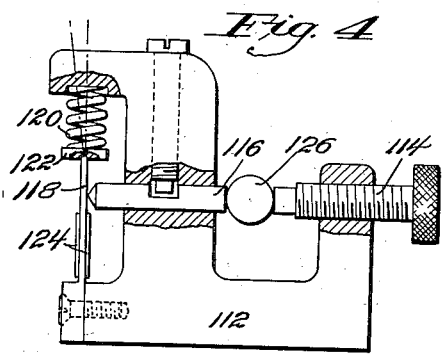
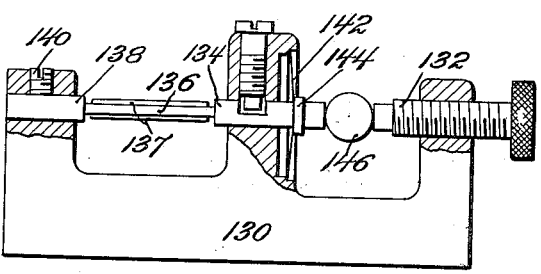
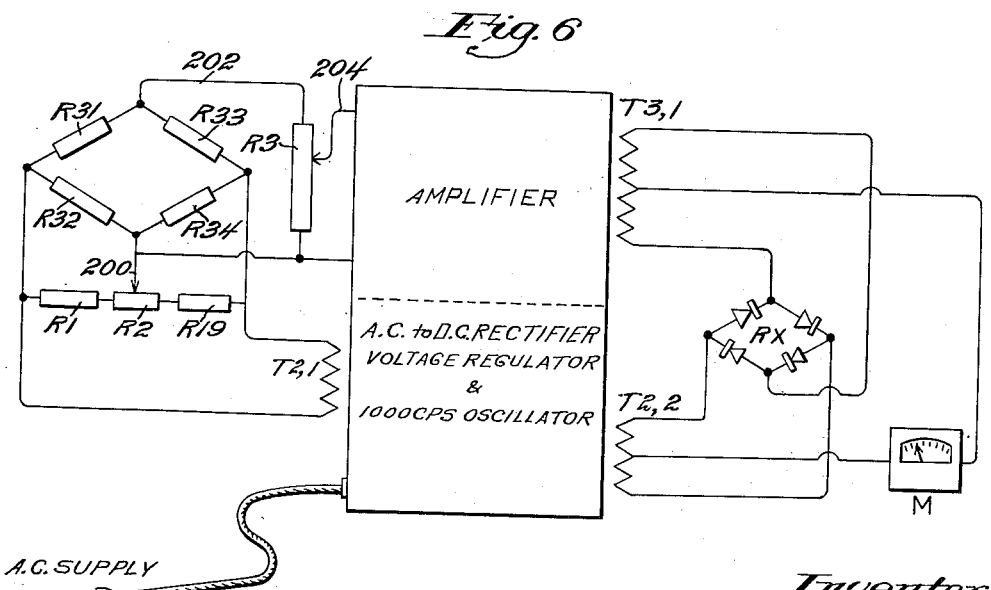
Witness
Jas. J. Maloney.
Inventor
George N. Levesque
by his Attorney
Maxwell Fish Jan. 1, 1952     G. N. LEVESQUE     2,581,264
GAUGE Filed Aug. 1, 1945     3 Sheets-Sheet 3

Witness
Jas. J. Maloney

Inventor
George N Levesque
by his Attorney
Maxwell Fish

Patented Jan. 1, 1952

2,581,264

UNITED STATES PATENT OFFICE 2,581,264

GAUGE

George N. Levesque, Cranston, R. I., assignor to Brown and Sharpe Manufacturing Company, a corporation of Rhode Island Application August 1, 1945, Serial No. 608,153

15 Claims. (Cl. 33—147)

The present invention relates to improvements in gauges.

More particularly, the invention is concerned with improvements in comparator gauges of the general type which comprise with work locating means, a movable work contacting member and means for measuring the movement of the member, and which are employed in the making of very small linear measurements which may be in the order of a ten thousandth to a hundred thousandth of an inch.

It is a principal object of the invention to provide a novel and improved gauge of this general description which will be reliable and efficient in operation for effecting fine linear measurements.

It is a further object of the invention to provide a novel and improved gauging device comprising in combination both mechanical and electrical means adapted for detecting, accurately measuring and amplifying for visual inspection the most minute movements of the gauge work contact member.

In accordance with the present invention, a comparator gauge is provided, having a mechanical arrangement of its parts such that linear movement of the work contactor with relation to the gauge housing or support acts to subject a distortable element within the gauge to a variable degree of strain, and having in combination therewith electrical means including electrical strain sensitive gauges and amplifying and visual inspection means, for detecting and accurately measuring such variations of strain as an indication of the linear position of the work contacting member.

In a preferred form of the invention, the element of the gauge subjected to distortion takes the form of a collapsed column which may, for example, be a metal plate supported in a bowed position under end pressure sufficient to maintain the plate in a bent or collapsed position. The arrangement of the gauge is such that movement of the work contacting member of the gauge in one direction or the other will cause the plate to be either further bent or to be slightly straightened within a range of movement in which the resistance encountered is substantially uniform. Electrical strain sensitive gauges applied to the surfaces of the plate record variations of strain imposed on the plate due to any variations in the amount of bend of the collapsed column or plate imposed by linear movement of the work contacting member of the gauge.

In another form of the invention, the strained element of the gauge may take the form of a plate which is subjected to a continuous tensioning strain as, for example, by means of a Bellville spring. Linear movement of the work contacting member of the gauge is rendered operative to increase or to partially relieve the tensioning strain imposed on the strained element by the Bellville spring, and such variations are measured by means of electrical strain sensitive gauges which are secured to the surfaces of the plate.

In still another form of the invention, the strained element of the gauge may take the form of a metal plate which is rigidly supported at one end and is arranged to be acted upon at its free end by means of a coiled spring which tends to bias the plate in one direction. A work contacting member is arranged to engage the face of the plate tending to move the plate in the opposite direction. Changes of distortion of the plate produced by linear movement of the work contacting member are measured by means of electrical strain sensitive gauges mounted on the surfaces of the plate.

While three examples are herein given of different forms of apparatus including a metal part which may be subjected to variable and measurable strains by movement of a work contact member, it will be understood that applicant is not limited to the specific embodiments shown, and that parts of other description capable of being subjected to measurable strains and of being distorted in other ways may be employed within the scope of the present invention.

Figure 7:
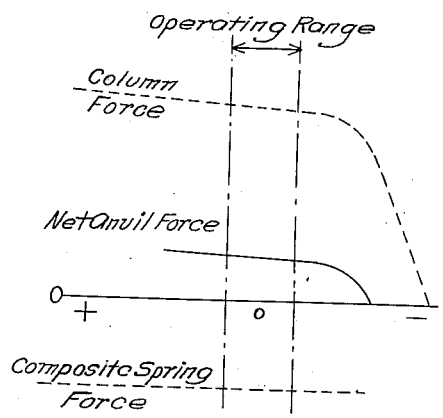
Figure 8:
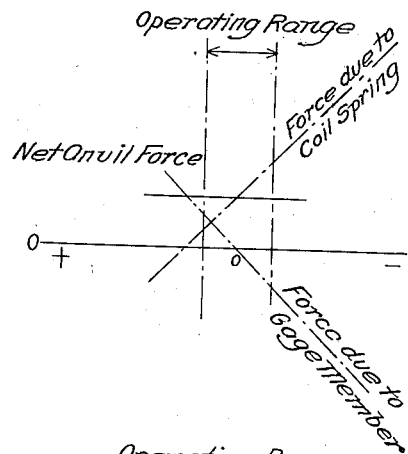
Figure 9:
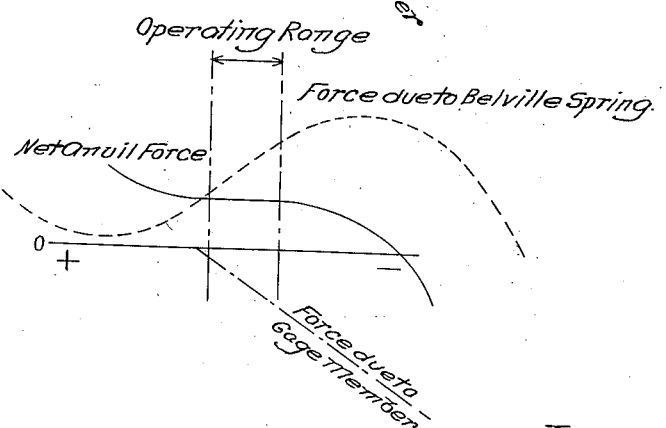

The several features of the invention consist also in the devices, combinations and arrangement of parts hereinafter described and claimed which, together with the advantages to be obtained thereby, will be readily understood by one skilled in the art from the following description taken in connection with the accompanying drawings, in which Fig. 1 is a right side sectional view of a comparator gauge illustrating in a preferred form the several features of the invention; Fig. 2 is a partial sectional view in front elevation of the gauge, taken on the line 2—2 of Fig. 1; Fig. 3 is a sectional view in front elevation taken on the line 3—3 of Figure 1; Fig. 4 is a somewhat fragmentary view in right side elevation, partly in section, of a comparator gauge illustrating a specifically different arrangement and metal part associated therewith which is to be subjected to measurable variations of strain thereon; Fig. 5 is a somewhat fragmentary view in right side elevation, partly in section, illustrating still another form of the invention embodying a work contactor member and a still different form of the metal part which is subjected to measurable variations of strain by movement of the contactor member;

Fig. 6 is a diagram of the electrical connections from the strain gauges including a balancing circuit for the four strain gauges contemplated, an amplifier and a visual indicator device; and Figs. 7, 8 and 9 are diagrams indicating net anvil force for each of the three alternative forms of the invention shown.

The comparator gauge which forms the subject-matter of the present invention fills a long felt need for a gauge which is capable of recording the finest measurements of linear distances with certainty and accuracy, and which will at the same time be of simple and rugged construction well adapted for use under commercial conditions.

A principal feature of the invention consists in the use of an element as, for example, a thin metal plate, which is capable of being distorted in accordance with linear movement of a work contacting member to produce measurable variations of strain therein, in combination with electrical means including strain gauges capable of detecting and measuring the most minute variations of distortion or strain produced in said element.

Another feature of the invention consists specifically in the provision of a comparator gauge device including a movable work contacting member and connections therefrom for producing in a metallic or other suitable element accurately corresponding measurable variations of distortion whereby movements of the work contacting member through linear distances in the order of a hundred thousandth of an inch may be readily measured and the findings amplified for easy visual inspection.

A preferred embodiment of the invention in a comparator gauge for the making of external comparator measurements upon work is illustrated in Figs. 1 to 3, inclusive and Fig. 6 of the drawings. The gauge shown in these figures comprises a base 10 on which is mounted an anvil support 12 for the work and an over-arm support 14 which carries a vertically movable work contact member or feeler 16. The over-arm support is mounted for vertical adjustment on the ways 18 formed on the rear side of a column 20 on the base 10 and is moved up and down by means of an adjusting screw 22 supported to turn in a bearing provided by a bushing 24 carried in the upper part of the over-arm support 14. The screw 22 is arranged for threaded engagement with a nut 26 which is rigidly secured as a plug into the upper end of the hollow column support 20.

The work contacting member 16 is in the form of a plunger which is slidably supported in a lower bearing provided by a bushing 28 carried by the over-arm support 14 and in an upper bearing provided in a sleeve 30 mounted for vertical adjustment on the over-arm support 14. The work contact member is urged downwardly by means of a compression spring 32 coiled about the plunger between the lower end of the sleeve 30 and a shoulder provided by a U-shaped block 34 formed in the middle portion of the plunger. The lower face of the block 34 is arranged for engagement against the upper end of the bushing 28 to limit the downward movement of the work contacting member. A plug 36 screw-threaded through the bushing 28 and having a pin formed on the end thereof is arranged for engagement in an elongated slot 38 formed in the work contacting member 16 and serves to prevent plunger 16 from rotating in its bearing. The screw-threaded plug 36 may be screwed in to clamp the plunger 16 in its bearing. The sleeve support 30 is arranged for vertical adjustment in order to permit an adjustment of the force exerted by the spring 32, and is clamped in position by means of a set screw 40 with a knurled head which is provided at its inner end with a pin 42 of smaller diameter which engages in a vertical slot 44 in the sleeve support 30. The tightening of the set screw 40 engages the pin 42 against the base of the slot 44 to clamp the sleeve rigidly in position. The engagement of the pin 42 in the slot 44 serves to limit movement of the sleeve support 30 in either direction and to prevent rotational movement of the sleeve support when the set screw 40 has been loosened.

Movement of the work contacting member 16 within the limited range provided by the present construction is adapted to produce a corresponding variation in the degree of distortion of a collapsed column which, in the construction shown in Figs. 1 to 3 inclusive, takes the form of a flat plate 50, and is held in its collapsed position between jaws 52 and 54. A group of four bonded electrical strain sensitive gauges generally indicated at 79 in Figs. 1 and 2, are secured, two to each side of the plate 50. The jaw 52 is stationary, being formed as a forward projection on a block 56 which is rigidly secured by screws 58 to the over-arm support 14. The jaw 54 is movable, being formed on an arm 60 which is pivotally supported at its rear end on a leaf spring 62 secured at one end to the arm 60 and at its other end to a rearwardly extending arm 64 which forms part of the block 56. A forward extension 66 of the pivoted arm 60 carries a contact element 67 which engages with the upper inside face of the U-shaped block 34 of the work contacting member 16. The arm 60 is urged upwardly by means of a compression spring 68 coiled about a link bolt 70 and seated at its upper end against the enlarged head 72 and at its lower end against a seat formed in the arm 64 of the block. The link bolt 70 extends downwardly through the movable arm 60, being threaded thereto and provided with a check nut 74 which engages against the under side of the arm 60. Upward movement of the arm 60 under the influence of spring 68 to increase the distortion of the collapsed column 50 is limited by means of an adjustable set screw 76 screw-threaded through the arm 60 and arranged for engagement with the under side of the block 56. A locking nut 78 serves to maintain the stop screw 76 in adjusted position.

From an inspection of Fig. 1 of the drawings, it will readily be evident that the jaw arm 60 and forwardly extending contact portion 66 are maintained in continuous engagement with the U-shaped block 34 through the opposed action of the two springs 68 and 32, the spring 68 tending to move the movable jaw arm 60 upwardly and spring 32 tending to move the work contacting member 16 downwardly. The relative strength of the two springs is adjusted to cause the work contacting member 16 to be forced yieldingly downwardly under an extremely light pressure which is sufficient to insure a firm work engaging contact but with minimum possibility of indenting the work piece. In this connection, it is to be particularly noted that the member 50 is bowed or bent sufficiently to form a collapsed column, that is, a column which has failed but has not exceeded its elastic limit, so that the member 50 is maintained at all times in a distorted position such that movement upwardly or down of the movable jaw arm 60 with consequent change in the amount of bend or distortion of the member 50 will not have any appreciable effect to change the amount of the endwise pressure exerted by the collapsed column 50 while tending to straighten itself. With this construction and arrangement of the gauge mechanism including the movable contact member, the movable jaw arm 60 and the collapsed column 50, the downward pressure exerted by the work contacting member, that is, the net anvil pressure shown in the diagram Fig. 7, will be kept at a substantially constant value over the full range of adjustment of the work contacting member. In the illustrated form of the comparator gauge illustrated in Figs. 1 to 3 inclusive, and Fig. 7, it is assumed that the work contacting member will have an operating range of movement of two-thousandths of an inch.

In order to provide a fine adjustment of the device which will enable a zero reading of the visual inspection gauge to be readily obtained when the comparator gauge is set up with a reference standard in place, the gauge illustrated in Figs. 1 to 3 inclusive, is constructed and arranged to permit a slight adjustment to be made in the position of the movable jaw arm 60 after the position of the work contacting member 16 in engagement with the standard work piece has been established. For this position of parts, it will be assumed that the work contacting member 16 is in a position substantially midway between the limits of movement and the movable jaw arm 60 is in a corresponding midposition between limits of movement in which the stop screw 76 is out of engagement with the stationary block 56. The adjustment referred to is now made by moving the pivotal support for the movable jaw arm 60 upwardly or down by a slight amount so that the arm 60 moves about its point of engagement with the U-shaped block 34 of the work contacting member 16 as a pivot. In order to provide for such an adjustment, the block 56 is formed with a horizontal slot 84 cut from the rear side of the block to form the relatively narrow rearwardly extending arm 64 in the block which provides the pivotal support for the movable jaw arm 60. In order to provide for the desired upward and downward adjustment of the arm 64 for the movable jaw arm 60, a device is provided for springing the arm 64 downwardly a slight amount from the main body portion of the block 56. This device comprises a laterally extending cylinder 88 which is rotatably mounted in a journal formed in the block 56 and is provided intermediate its ends with a reduced eccentric portion 90 which is arranged to be engaged by a stop screw 92 extending upwardly through the rearward end of the arm 64 which provides support for the jaw arm 60. Rotational movement of the cylinder 88 will cause the arm 64 to be biased to a greater or lesser extent downwardly. The cylinder 88 is pinned to a rock shaft 94 which is in axial alignment therewith and carries at its outer end a knob 96 for convenience of adjustment on the part of the operator. In the illustrated construction of the machine in Fig. 1, an adjustment is possible within a range which will correspond to a movement of two ten-thousandths of an inch of the work contacting member 16.

For limiting adjustment of the manual member 96, a radially extending pin 98 is mounted in the cylinder 88 and is adapted for engagement at one limit of movement with an abutment formed on an adjustable plate 100 mounted on the side of the block 56, and at the other limit of movement with a fixed stop 99. The plate 100 is provided with an arcuate slot 102 which receives two locking screws 104 for supporting and locking the plate 100 in adjusted position.

Another function of the eccentric 90 is to provide a convenient check of magnification of the instrument. With existing measuring devices of either the pneumatic or electric type where the graduations on the recording means such as a meter can be assigned varying values, it is necessary to use loose pieces to check periodically whether the values assigned to the graduations are remaining constant. For example, if a difference in size of .0001" between work pieces is intended to throw the indicating pointer five divisions or spaces on the meter, it is desirable to check occasionally that this throw remains constant in order to avoid incorrect readings of work size. In gauges with which applicant is familiar, it is the practice to use gauge blocks with known differences in thickness or a single gauge block with a step of known height. Such a loose piece must be available for checking at any time and there is the possibility that it may become misplaced. Gauge blocks also wear with repeated use and such blocks used for magnification checking would eventually require replacement. The arrangement provided by applicant overcomes both of these disadvantages. By adjusting the position of the stop surface on plate 100, eccentric 90 on shaft 94 can be given a range of action between the fixed stop pin 99 and the adjustable stop to indicate with precision a change of distortion of the collapsed column equal to a definite movement of the work contacting member. The desired range of movement of the knob 96 which will correspond to a definite movement of the work contacting member 16 and to a definite movement of the indicating pointer is determined accurately by using gauge blocks. This is done in manufacture, and once determined, is fixed. Inevitable wear which occurs, however, can be overcome by readjusting with the aid of gauge blocks the position of the stop surface on plate 100 with relation to the fixed stop to restore the original value. Therefore, in addition to providing by means of cam 90 a fine zero setting, the same device may be used by turning the knob 96 from one to the other limit of movement to provide a quick check of the electrical magnification of the instrument. If, due to varying electrical potential, temperature or other causes, the values of the meter divisions vary slightly over a period of time, as indicated by the mechanical amplification check, the electrical magnification can be altered to restore the original values of the meter divisions. When the actual magnification of the instrument does not agree with the value of sensitivity indicated on the face of the amplifier through the knob and graduated scale used in adjusting potentiometer R3, to be more fully described, the amplifier gain is adjusted in conventional manner by means provided in the amplifier and independent of the sensitivity potentiometer R3 for varying the resistance in the circuit. The sensitivity scale, although intended in practice to be used at relatively few points between .0001" and .00001" per division of the meter scale, can be chosen and set for any intermediate value.

An alternative form of comparator gauge embodying certain features of the invention, is shown in Fig. 4 of the drawings, in somewhat diagrammatic form. A frame or base 112 is provided in which is mounted a horizontally disposed adjustable screw-threaded stop 114 which constitutes the work locating means for the gauge, and a movable work contacting member 116 in the form of a plunger which is arranged for movement in axial alignment with the stop 114. The work contacting member 116 engages at its rear end against a vertically extending spring plate 118 which is rigidly secured at its lower end to the base 112 and at its upper end is arranged to be acted upon by a compression spring 120 supported at one end in a seat in an overhanging portion of the frame 112 and at its other end against a block 122 which is seated on the upper end of the spring plate 118. As indicated by the construction lines in Fig. 4, the spring 120 tends to distort the plate 118 to the right when the plate is in the position of no bending strain, at which time the spring 120 exerts a force tending to bias the plate 118 to the right. A group of four strain gauges 124 are mounted upon the lower portion of the spring plate 118, two on each side. In the operation of this device, it is contemplated that a work piece of standard dimensions will be placed in the gauge in the position as illustrated, for example, at 126 in Fig. 4 and the screw stop 114 will be tightened, thus forcing the standard work piece 126 and work contacting member 116 to the left until the pointer of the indicating meter reaches a central zero position on the dial. As the spring plate 118 is distorted or bent to the left, the spring 120 is operative to offset the steadily increasing pressure of the spring plate to return, thus reducing the net anvil pressure of the work contacting member 116 against the work piece so that this pressure is maintained at a substantially constant low value, as shown in the accompanying diagram Fig. 8. The degree of distortion impressed upon the spring plate 118 is measured as hereinafter more fully described by means of electrical devices including the electrical strain sensitive gauges 124 and electrical amplifying and visual inspection means hereinafter more fully to be described. When the gauge has been adjusted to a zero reading, a work piece to be gauged, is placed in the device in place of the standard work piece 126. Variations in distortion of the spring plate 118 from the position established by the use of a standard work piece will then act through the electrical connections including strain gauges 124 to indicate the variations in linear dimensions from standard of the work pieces being gauged.

Another form of comparator gauge embodying the several features of the invention is shown in Fig. 5 of the drawings, again in somewhat diagrammatic form. In this view, the frame 130 is provided within which is mounted a horizontally disposed adjustable screw-threaded stop 132 for which constitutes the work locating means for the gauge, and a movable work contacting member 134 arranged in axial alignment with the stop 132. The work contacting member 134 is formed integrally with a plate 136 capable of having imparted thereto measurable tensioning strains, the other end of the plate 136 being formed integrally also with a plug 138 secured by a set screw 140 in an upwardly extending arm of the base 130. In this embodiment of the invention, the four strain gauges are provided as generally indicated at 137, two on one side of the plate 136 being laid longitudinally, and the two on the other side of the plate being laid transversely, for measuring the tensioning strains to which the plate 136 may be subjected. The work contacting member 134 is arranged to be acted upon by a Bellville spring 142 which bears against a shoulder 144 formed on the member 134 and tends to thrust said member to the right, maintaining the plate 136 under a tensioning strain. With this embodiment of the invention, the work piece of standard dimensions such as that designated at 146 is placed in a gauge between the stop member 132 and the work contacting member 134, and the stop member 132 is then screwed inwardly to decrease the tensioning strain upon the plate 136 until the reading of the electrical visual inspection means of the device registers at zero reading. The standard work piece 146 may be then removed and the piece to be measured put in place thereof. Any differences in size of the work piece to be measured from standard will be instantly transmitted in the form of either an increase or decrease in the tensioning strain to which the plate 136 is subjected. Any such difference in the amount of strain will be recorded by the strain gauges 137. In order to maintain a substantially uniform anvil pressure of relatively low value over the range of movement of the work contacting member, a Bellville spring, having a characteristic as shown in Fig. 9, is employed which will offset the resistance characteristic of the strained element 136, as indicated in Fig. 9.

In accordance with the invention, electrical strain sensitive gauges are employed which operate in combination with the mechanical gauge mechanism above described, to provide an extremely sensitive and accurate indication of small linear movements of the work contacting member of the gauge. In the illustrated form of the invention, a group of four electrical strain sensitive gauges are mounted in pairs on opposite sides of the distorted or strained element of the gauge in order to measure variations of strain caused by variations of distortion of the strained element as the work contacting member moves in one or the other direction. Inasmuch as electrical strain sensitive gauges including amplifying electrical circuits for the same are well known, it is believed unnecessary to describe these devices in detail except to point out that a gauge of this general description comprises a finely drawn wire which is bonded throughout its effective length in a suitable form of cementing agent, and the gauge is then similarly secured or bonded to the surface of the strained element. In the illustrated form of the invention, a group of four electrical strain sensitive gauges are employed, two being mounted on each side of the metal plate which constitutes the element of the gauge to be subjected to measurable strains. These gauges are incorporated into a Wheatstone bridge balancing circuit which acts through an amplifying device to control the position of the pointer of a meter with a zero center scale.

A preferred form of electrical amplifier circuit for use with applicant's comparator gauge is illustrated in somewhat diagrammatic form in Fig. 6 of the drawing. Since certain devices employed and electrical circuits embodying these devices are well known in the art and form specifically no part of the present invention, only such description is included herewith as is believed necessary to enable one skilled in the art to understand the connection of the present invention therewith. Referring more specifically to Fig. 6, applicant has shown four electrical strain sensitive gauges indicated respectively at R31, R32, R33 and R34 arranged in the form of a Wheatstone bridge balanced circuit. Current is supplied to the strain gauge Wheatstone bridge circuit from an A. C. supply through a conventional rectifier circuit which serves to supply a filtered direct current voltage. Part of the D. C. current is regulated by a gaseous regulator tube which, being a piece of ordinary equipment is not shown, to supply a 1000 cycles-per-second triode oscillator and the last amplifier tube of the amplifier circuit which is again of ordinary description. The 1000 cycles-per-second oscillator supplies the Wheatstone bridge through secondary T2,1 of the oscillator transformer, and also the rectifier RX through secondary T2,2 of the same oscillator transformer. Forming part of the Wheatstone bridge circuit are two resistors R1 and R19 which, together with the potentiometer R2, affords a means for electrically adjusting the balance of the strain gauge bridge circuit. Any unbalance voltage appearing across two of the points designated at 200 and 202, respectively, is fed to the potentiometer R3 which, by means of a conventional knob and graduated scale on the front of the amplifier, is used to vary sensitivity of the device. Any desired fraction of the unbalance voltage is selected at points 204 and 202 and is impressed on the grid of the first amplifier tube of the amplifier. The unbalance voltage is amplified and appears in the secondary T3,1 of the output transformer associated with the last amplifier tube. The output current is rectified by the circuit consisting of the ring connected copper oxide rectifier RX, the transformer windings T3,1 and T2,2. A current flows through the meter M which is proportional to the strength of the output voltage hence to the degree of the strain gauge bridge unbalance, and in a direction determined by the relative phase relations between the voltage in the transformer winding T2,2 and the voltage in the transformer winding T3,1 which is in turn determined by the direction of the strain gauge bridge unbalance.

The comparator gauge herein illustrated having in combination electrical strain sensitive gauges arranged for measuring strains induced in a distortable element of the gauge has certain particular advantages. Such a gauge employing electrical strain sensitive bonded gauges has been found to afford a very stable and easily adjusted comparator. Mechanical features of the gauge which have been found to be of particular advantage include the use of the collapsed column to provide a net anvil force against a work piece which is of substantially constant value over the full range of movement of the work contacting member. The alternative forms of mechanical construction illustrated, including the offsetting spring force acting against the beam of Fig. 4 and the Bellville spring employed with the tensioned member of Fig. 5 to cancel the force build-up of the gauge, have also been found valuable for maintaining a constant low net anvil force.

Another feature of the invention which has been found most valuable is the mechanical adjustment of supporting arm 64 for the jaw arm 60 in order to adjust the position of the pointer of the visual inspection meter to a zero position and to provide a convenient check of the electrical magnification.

While a comparator gauge adapted for making external measurements is shown as embodying in a preferred form the several features of the invention, it will be understood that the several features of the invention are equally well adapted for the making of internal measurements. Applicant is not limited to the particular form and mounting of the work contacting member illustrated.

The invention having been described, what is claimed is:

1. A gauge which comprises a support, a contact element carried by the support for movement over a limited range with relation to the support, a distortable element supported from the support as a bowed column to be maintained under a condition of strain and connected with the contact element to be extended and compressed with the movement of the contact element within an area of substantially constant resistance to said distortion in which the distortion has caused the element to fail as a column but not to exceed its elastic limit, and electrical measuring means including an electrical strain sensitive gauge mounted on said distortable element to detect and to measure variations of strain produced in said element by the distortion thereof as an indication of the position of said contact element.

2. A gauge which comprises a support, a contact element carried by the support for movement over a limited range with relation to the support, a distortable element supported from the support as a bowed column to be maintained under a condition of strain, a connection between the distortable element and contact element whereby the distortable element is arranged to be extended and compressed with movement of the contact element within an area of substantially constant resistance to said distortion in which which the distortion has caused the element to fail as a column but not to exceed its elastic limit, and electrical measuring means including an electrical strain sensitive gauge comprising an electrical conductor bonded throughout its effective length to a surface of the distorted element to detect and to measure variations of strain produced in said element by the distortion thereof as an indication of the position of the contact element.

3. A gauge which comprises a measuring head, a contact element suported on the head for a limited range of movement with relation to the head between advanced contact and retracted out-of-contact positions, spring means in the head acting between the head and the contact element to urge the contact element toward the advanced position, an arm pivoted on the head and a countertensioning spring acting thereon to engage the arm with and to move the contact element toward the retracted position, a distortable element supported as a column against said arm and a portion of said head to be maintained under a condition of strain and to be extended and compressed with the movement of the contact element within an area of substantially constant resistance to said distortion in which the distortion has caused the element to fail as a column but not to exceed its elastic limit, and electrical measuring means including an electrical strain sensitive gauge attached to said distortable element to detect and to measure variations of strain produced in said element by the distortions thereof as an indication of the position of said contact element.

4. A gauge which comprises a base, a measuring head on the base, a contact member supported on the head for a limited range of movement with relation to the head between advanced contact and retracted out-of-contact positions, a spring acting between the head and the contact member to urge the contact member in one direction, an arm pivoted on the head having a limited range of movement arranged to engage with and urge the contact member in a direction opposed to said spring, a countertensioning spring and a distortable element supported and arranged in the measuring head respectively between said arm and portions of said head to act against said arm and said portions of said head in opposite directions and having a net effect to bias the arm and contact member engaged thereby against the pressure of said first mentioned spring, said distortable element being supported in the head as a column under a condition of strain and to be extended and compressed with the movement of the work supporting member within an area of substantially constant resistance to said distortion in which the distortion has caused the element to fail as a column but not to exceed its elastic limit, and electrical measuring means including an electrical strain sensitive gauge operatively connected with said distortable element to detect and to measure variations of strain produced in said element by the distortion thereof as an indication of the position of said contact member.

5. A gauge which comprises a measuring head, a contact member supported on the head for a limited range of movement with relation to the head between advanced contact and retracted out-of-contact positions, yieldable means acting between the head and the contact member to maintain a constant net pressure on said contact member toward the advanced position including a distortable strip element supported from the head as a bowed column and connected with the contact member to be maintained under a condition of strain and to be extended and compressed with the movement of the contact member within an area of substantially constant resistance to said distortion in which the distortion has caused the element to fail as a column but not to exceed its elastic limit, and electrical measuring means including an electrical strain sensitive gauge attached to said strip element, amplifier means, and visual inspection indicating means for detecting and for measuring variations of strain produced in said strip element by variations in the degree of distortion thereof as an indication of the position of said contact member.

6. A gauge which comprises a base, a measuring head on the base, a contact member supported on the head for a limited range of movement with relation to the head between advanced contact and retracted out-of-contact positions, yieldable means acting between the head and the contact member to maintain a net pressure on said contact member toward the advanced position including a distortable strip element supported from the head as a bowed column and connected with said contact member to be maintained under a condition of strain and to be extended and compressed with the movement of the contact member within an area of substantially constant resistance to said distortion in which the distortion has caused the element to fail as a column but not to exceed its elastic limit, and electrical measuring means including a plurality of electrical strain sensitive gauges each comprising an electrical conductor bonded throughout its effective length to a surface of the distorted strip, a Wheatstone bridge balancing circuit for said strain gauges, an amplifier, and an indicating meter.

7. A gauge which comprises a base, a measuring head on the base, a contact member supported on the head for a limited range of movement with relation to the head between advanced contact and retracted out-of-contact positions, a spring acting between the head and the contact member to urge the contact member toward the advanced position, a pivot member, an arm pivoted on the pivot member and countertensioning spring acting thereon to engage the arm with and to move the contact member toward the retracted position, a distortable element supported in the head between the pivoted arm and the head as a bowed column to be maintained under a condition of strain and to be extended and compressed with the movement of the contact member within an area of substantially constant resistance to said distortion in which the distortion has caused the element to fail as a column but not to exceed its elastic limit, electrical measuring devices including a group of electrical strain sensitive gauges each comprising an electrical conductor bonded throughout its effective length to a surface of the strained element, a Wheatstone bridge balancing support for said strain gauges, an amplifier, an indicating meter calibrated to indicate movement of the contact member from a zero position in terms of units of linear measurement, and a device for moving the pivot member and arm therewith about the point of contact with the work contacting member for adjustment of said indicating meter to said zero position.

8. A gauge which comprises a base having work locating means, a measuring head on the base, a work contact member supported on the head for movement in a limited range on the head between advanced and retracted positions toward and away from the work, a spring acting between the head and the work contact member to urge the work contact member toward the advanced position, a distortable strip arranged to be supported as a bowed column under a condition of strain between two jaws and to be extended and compressed with movement of the work contact member, a block secured to the head providing one of said jaws to receive one end of said strip and further recessed to provide a flexible portion of the block as a support, an arm pivoted at one end to said support and at its other end having an engaging contact with the work contact member and intermediate its length providing the other of said jaws to receive the other end of said strip, spring means connected between the block and the pivoted arm acting on said arm in a direction to distort said strip and to move the work contact member toward its retracted position, relatively adjustable stop surfaces on the arm and block for limiting said movement of the arm, a mechanically operable device for flexing said support toward and away from the block in order to vary the degree of distortion of said strip, electrical measuring devices including a group of electrical strain sensitive gauges each comprising an electrical conductor bonded throughout its effective length to the surface of the strained element, a Wheatstone bridge balancing circuit for said strain gauges, an amplifier, and an indicating meter calibrated to indicate movement of the work contacting member from a zero position in terms of units of linear measurement.

9. A gauge which comprises a measuring head, a contact member supported on the head for a limited range of movement with relation to the head, a distortable element supported at one end from the head as a bowed column to be maintained under a condition of strain, a pivot member, an arm pivoted on the pivot member, said arm having a point of engagement with the contact member and providing a jaw for supporting the other end of said element to be extended and compressed between the head and said jaw with the movement of the arm and contact member within an area of substantially constant resistance to said distortion in which the distortion has caused the element to fail as a column but not to exceed its elastic limit, a pivotal support for said arm adjustable on the measuring head, electrical measuring means including an electrical strain sensitive gauge attached to said distortable element, amplifying means, a visual inspection meter calibrated to indicate movement of the contact member in terms of units of linear measurement, and means for adjusting said pivotal support to vary the distortion of said element independently of movement of the contact member.

10. A gauge which comprises a measuring head, a contact member supported on the head for a limited range of movement with relation to the head, a distortable element supported from the measuring head as a bowed column to be maintained under a condition of strain, a pivot member, an arm pivoted on the pivot member, said arm having a point of engagement with the contact member and arranged to engage against said element to cause the element to be extended and compressed with the movement of the arm and contact member, electrical measuring means including an electrical strain sensitive gauge attached to said distortable element to detect and to measure variations of strain produced in said element by the distortion thereof as an indication of the position of said contact member, and a support for said pivot member adjustable in the measuring head for varying the distortion of said element independently of movement of the contact member.

11. A gauge which comprises a base, a measuring head on the base, a contact member supported on the head for a limited range of movement with relation to the head between advanced and retracted positions toward and away from the work, a spring acting between the head and the contact member to urge the contact member toward the advanced position, an arm pivoted on the head, and a countertensioning spring acting thereon to engage the arm with and to move the work contact member toward the retracted position, a distortable element supported in a condition of strain between said arm and a portion of the head against the pressure exerted to move the arm by said countertensioning spring, said spring, countertensioning spring and distortable element being chosen and arranged to impose a slight net pressure of substantially constant value within said range of movement upon said work contact member toward the extended position, and an electrical measuring device including an electrical strain sensitive gauge attached to said distortable element to detect and to measure variations of strain produced in said element by the distortion thereof as an indication of the position of said work contacting member.

12. A gauge which comprises a base, a measuring head, a work contact member supported by the head for a limited range of movement between advanced and retracted positions with relation to the head, yieldable means in the head arranged to maintain a substantially unchanged net engaging pressure on said contact member within said range of movement and in the direction from the retracted to the advanced position including a spring and a counterbalancing spring supported between portions of the head and said contact member to act upon said contact member in opposed directions, and a distortable element supported from the head as a bowed column and connected with the contact member to be maintained under a condition of strain to be varied with the movement of said contact member within an area of substantially constant resistance to said distortion in which the distortion has caused the element to fail as a column but not to exceed its elastic limit, and electrical measuring means including an electrical strain sensitive gauge attached to said distortable element to detect and to measure variations of strain produced in said element by the distortions thereof as an indication of the position of said work contacting member.

13. A gauge which comprises a base, a measuring head on the base, a contact member supported on the head for movement in a limited range on the head between advanced contact and retracted out-of-contact positions, a spring acting between the head and the contact member to urge the contact member toward the advanced position, a distortable metal strip arranged to be supported in a bowed position under a condition of strain and to be extended and compressed with movement of the contact member, a block secured to the head providing a jaw to receive one end of said metal strip and further recessed to provide a flexible portion of the block as a support, an arm pivoted at one end to said support and at its other end having an engaging contact with the contact member and intermediate its length providing a second jaw to receive the other end of said strip, spring means connected between the block and the pivoted arm in a direction to distort said strip to move the work contact member toward its retracted position, relatively adjustable stop surfaces on the arm and block for limiting said movement of the arm, electrical measuring means including an electrical strain sensitive gauge attached to the said distortable strip to detect variations of strain produced in said strip, amplifying means, and an indicating meter calibrated to indicate movement of the work contacting member from a zero position in terms of units of linear measurement, and a mechanically operable device for adjusting the position of said support portion of the block and thereby to produce a zero setting and magnification check of the electrical means.

14. A claim according to claim 13 in which the device for adjusting the pivot support of the arm comprises an adjustable stop screw threaded to the support portion, a cooperating cam on the block arranged to be engaged by said stop screw having the rise portion thereof adjusted to effect a distortion of said element equal to that produced by a movement of said contact member over said limited range, and a manual control connected with the cam for adjusting the angular position of the cam.

15. A gauge which comprises a measuring head, a contact member supported on the head for movement in a limited range between advanced contact and retracted out-of-contact positions, a distortable element supported from the measuring head as a bowed column to be maintained under a condition of strain, a block secured to the head having a flexible portion, a pivot member mounted on said flexible portion of the block, an arm pivoted on said pivot member connected with the contact member and element providing an operative connection between the contact member and distortable element arranged to be actuated by movement of the contact member to cause said element to be extended and compressed with the movement of the contact member, electrical measuring means including an electrical strain sensitive gauge attached to the said distortable element, amplifying means, a visual inspection meter calibrated to indicate movement of the contact member from a zero position in terms of units of linear measurement, and a manually operable control device for adjusting said connection to vary the distortion of the distortable element and the reading of said visual inspection meter while the position of the contact member remains unchanged comprising a cam and follower connection acting between the head and said flexible portion of the block to adjust the position of said pivot and arm about the connection of the arm with the contact member.

GEORGE N. LEVESQUE.

REFERENCES CITED

The following references are of record in the file of this patent:

UNITED STATES PATENTS

| Number | Name | Date |
|---|---|---|
| 447,276 | Brayton | Feb. 24, 1891 |
| 703,725 | Hardinge | July 1, 1902 |
| 931,475 | Picard | Aug. 17, 1909 |
| 1,258,426 | MacKintosh | Mar. 5, 1918 |
| 1,389,341 | Blood | Aug. 30, 1921 |
| 1,728,626 | Pairman | Sept. 17, 1929 |
| 2,045,474 | Kemler | June 23, 1936 |
| 2,178,745 | Emery | Nov. 7, 1939 |
| 2,197,198 | Street | Apr. 16, 1940 |
| 2,208,635 | Johnson | July 23, 1940 |
| 2,240,184 | Hathaway | Apr. 29, 1941 |
| 2,244,964 | Poock et al. | June 10, 1941 |
| 2,267,559 | Foster | Dec. 23, 1941 |
| 2,307,323 | LaFlamme | Jan. 4, 1943 |
| 2,316,203 | Simmons | Apr. 13, 1943 |
| 2,316,975 | Ruge | Apr. 20, 1943 |
| 2,322,319 | Ruge | June 22, 1943 |
| 2,362,626 | Giffen | Nov. 14, 1944 |
| 2,372,879 | Bjorklund et al. | Apr. 3, 1945 |
| 2,416,664 | Ruge | Feb. 25, 1947 |

FOREIGN PATENTS

| Number | Country | Date |
|---|---|---|
| 367,789 | Italy | Feb. 2, 1939 |
| 610,234 | France | June 1, 1926 |
| 872,402 | France | Feb. 9, 1942 |

OTHER REFERENCES

Publ.: "Journal of Scientific Instruments," November 1945, page 219, "An Electrical Micrometer," by D. C. Gall.